United States Patent [19]

Jordan

[11] Patent Number: 5,712,017
[45] Date of Patent: Jan. 27, 1998

[54] COMPOSITE MATERIALS COMPRISING A PLURALITY OF RESIN IMPREGNATED FELT LAYERS

[75] Inventor: Roland Jordan, N. Attleboro, Mass.

[73] Assignee: Albany International Research Co., Mansfield, Mass.

[21] Appl. No.: 394,469

[22] Filed: Feb. 27, 1995

Related U.S. Application Data

[63] Continuation-in-part of Ser. No. 177,562, Jan. 5, 1994, Pat. No. 5,527,598, which is a continuation-in-part of Ser. No. 57,620, May 5, 1993, abandoned.

[51] Int. Cl.$^6$ ........................................... B32B 5/12
[52] U.S. Cl. ........................................... 428/113; 442/388
[58] Field of Search .................................. 428/280, 282, 428/113; 442/388

[56] References Cited

U.S. PATENT DOCUMENTS

| | | | |
|---|---|---|---|
| 2,482,498 | 5/1949 | Nagel | 154/43 |
| 2,936,260 | 5/1960 | Alexander | 154/128 |
| 2,938,822 | 5/1960 | Nelson | 154/137 |
| 3,183,142 | 5/1965 | Tierney | 161/58 |
| 3,641,638 | 2/1972 | Laible | 28/72.2 R |
| 3,944,703 | 3/1976 | Harding | 428/288 |
| 4,200,818 | 4/1980 | Ruffing et al. | 310/214 |
| 4,590,539 | 5/1986 | Sanjana et al. | 361/400 |
| 4,883,700 | 11/1989 | Harpell et al. | 428/113 |
| 4,943,472 | 7/1990 | Dyksterhouse et al. | 428/240 |
| 4,986,865 | 1/1991 | Fujii | 156/214 |
| 5,190,802 | 3/1993 | Pilato | 428/111 |
| 5,234,752 | 8/1993 | Laflin et al. | 428/251 |
| 5,330,820 | 7/1994 | Li et al. | 428/113 |
| 5,385,623 | 1/1995 | Diaz | 156/197 |

*Primary Examiner*—Christopher Raimund
*Attorney, Agent, or Firm*—Fish & Richardson P.C.

[57] ABSTRACT

Composite materials are provided which include one or more felt layers, impregnated, in a compressed state, with a reinforcing polymeric resin, e.g., a water-borne phenolic resin. The composite material may further include other layers, e.g., a fibrous layer such as glass cloth or scrim.

14 Claims, 2 Drawing Sheets

COMPOSITE MATERIALS COMPRISING A PLURALITY OF RESIN IMPREGNATED FELT LAYERS

CROSS-REFERENCE TO RELATED APPLICATIONS

This application is a continuation-in-part of copending U.S. Ser. No. 08/177,562, filed Jan. 5, 1994, now U.S. Pat. No. 5,527,598, which was a continuation-in-part of U.S. Ser. No. 08/057,620, filed May 5, 1993, now abandoned.

BACKGROUND OF THE INVENTION

The invention relates to composite materials which are suitable for use in the passenger compartment of a commercial aircraft.

It is well known to use composite materials that include, e.g., glass fabric or nonwoven material which is coated or impregnated with polymeric resins, for forming structural elements and, in particular, non-load bearing structural elements. Advantageously, these composites typically replace heavier or more expensive materials. However, in certain environments, e.g., within the passenger compartments of modern aircraft, such composites are often unable to meet stringent requirements of strength and performance established for the safety of those within such aircraft. These requirements may be particularly strict where there is a perceived danger of fire. It is well-known that the performance of certain polymeric-based materials may be unsatisfactory, or even life-threatening, for reasons of heat release, flammability, smoke release and/or toxic gas release, and also for lack of strength, impact resistance and compression resistance, making these materials unsuitable for use in environments where they might otherwise provide a substantial benefit.

In certain environments, conventional composites also may transmit an undesirable level of heat and/or sound. For instance, there is a need in the aircraft industry for panelling and ductwork having acoustical properties which will minimize the noise level within the passenger compartment to improve passenger comfort. Many composites provide suboptimal acoustical insulation.

Finally, it is desirable that composite materials have good moldability, i.e., can be formed into complex shapes without wrinkling or other molding problems.

SUMMARY OF THE INVENTION

It has been found that the degree of sound or heat transmission through a composite material can be lessened by the incorporation into the composite of a layer of felt material that is impregnated, in a compressed state, with a reinforcing polymeric resin. During manufacture of the composite, the felt material is saturated, in an uncompressed state, with a polymeric binder, after which the saturated felt material is compressed, driving out trapped air and resulting in a dense felt layer carrying a relatively high level of reinforcing resin.

Preferred composite materials of the invention, in the presence of fire, exhibit levels of heat release, flammability, smoke release and toxic gas release that are below predetermined levels considered suitable for use within the passenger compartment of a commercial aircraft.

Preferably, the composite material includes at least one outer wall of a fibrous woven or non-woven web or fabric. This outer wall is coated or impregnated with a reinforcing polymeric resin and bonded to the felt layer(s). Preferably, the reinforcing polymeric resin is a phenolic resin. Both the felt and the fibrous layer may include fibers from the group selected from carbon, graphite, KEVLAR, glass, aramid, and mixtures thereof. Most preferably, the felt includes predominantly aramid fibers, with other fibers added as desired to enhance the mechanical and/or acoustical properties of the felt, and the fibrous outer layer comprises a glass fabric or scrim.

In a particularly preferred aspect, the composite includes a plurality of felt layers which are laid up at angles with respect to each other, i.e., each felt layer comprises a plurality of fibers having a predominant fiber direction and the felt layers are arranged so that the predominant fiber direction of each layer is at an angle with respect to the predominant fiber direction of the immediately adjacent felt layers. Preferably, the composite includes four felt layers, and each felt layer is disposed at a 90 degree angle with respect to immediately adjacent felt layers. In this embodiment, the composite material exhibits exceptional moldability and flexural strength.

In another particularly preferred aspect, the polymeric resin with which the felt layer is impregnated is a water-borne phenolic resin. The use of a water-borne resin, rather than a conventional organic solvent-based resin, allows the use of a very dilute resin solution without the environmental/safety problems occasioned by high levels of organic solvent. The inventors have found that by impregnating the felt layer with a dilute aqueous polymer solution, a controllable level of resin can be absorbed by the dense felt material.

Other preferred embodiments include the following features. The composite can include a barrier to render the composite impermeable to the flow of air, preferably selected so that the maximum flow of air through the composite sandwich, with a pressure differential of 20 psi thereacross, does not exceed 0.005 ft$^3$/min/ft$^2$. The barrier film may comprise a metallic film, e.g. aluminum, or a polymeric film, e.g. consisting essentially of polyvinylidene fluoride (PVDF). The composite may also include, in addition to or instead of the barrier layer, a decorative layer. The reinforcing polymeric resin preferably comprises chemical agents adapted to reduce the rate of heat release, more preferably those selected from the group consisting of aluminum trihydrate and zinc borate. In preferred embodiments the composite material has a peak heat release rate of approximately 50 kw/m$^2$ and a two minute heat release of approximately 50 kw-min/m$^2$ when tested in accordance with the requirements of FAR 25.853(a-1) through Amendment 25–66 and FAR 121.312(a)(1) through Amendment 121–198. More preferably, the peak heat release rate is less than 45 kw/m$^2$ and the two minute heat release is less than 45 kw-min/m$^2$. Preferably, the composite has a total weight of less than about 32 oz./yd$^2$, more preferably less than about 30 oz./yd$^2$.

According to another aspect, the invention features a method for forming a composite material which, in the presence of fire, has levels of heat release, flammability, smoke release and toxic gas release below predetermined levels considered suitable for use within the passenger compartment of a commercial aircraft. This method includes the steps of providing a layer of felt, impregnating the felt layer with polymeric resin binder and applying a fibrous web or cloth to one or both outer surfaces of the layer of felt. If the composite includes more than one felt layer, the layers are preferably individually impregnated with polymeric resin, the carrier (water) of the polymeric resin evaporated (preferably by heat drying), and the impregnated and dried ("b-staged") layers laid up at angles with respect to each other, preferably at right angles to each other. The method preferably further includes the step of applying heat and pressure to cure and bond the layers to form the composite material.

Preferred embodiments of this aspect of the invention may include one or more of the following additional features. The method may further include the step of coating or impregnating the fibrous web or cloth with a polymeric resin before applying it to the felt layer. The method may further include the step of applying a barrier film, e.g. a polymeric material, preferably consisting essentially of polyvinylidene fluoride, in the region of one or both outer surfaces of the composite material to render the composite material impermeable to air. The method may include applying a decorative layer to a surface of the composite. The barrier film and/or decorative film may be applied either prior to, during, or after the bonding step. The method may include the further step of molding the composite material to a desired curvilinear shape. The felt and the other layers of the composite material can be secured together by needling or stitching, in addition to bonding.

Objectives of the invention include to provide a composite material which, in the presence of fire, has levels of heat release, flammability, smoke release and toxic gas release below predetermined levels considered suitable for use within the passenger compartment of a commercial aircraft.

These and other features and advantages of the invention will be apparent from the following description of presently preferred embodiments, and from the claims.

DESCRIPTION OF THE PREFERRED EMBODIMENTS

Figure 1:
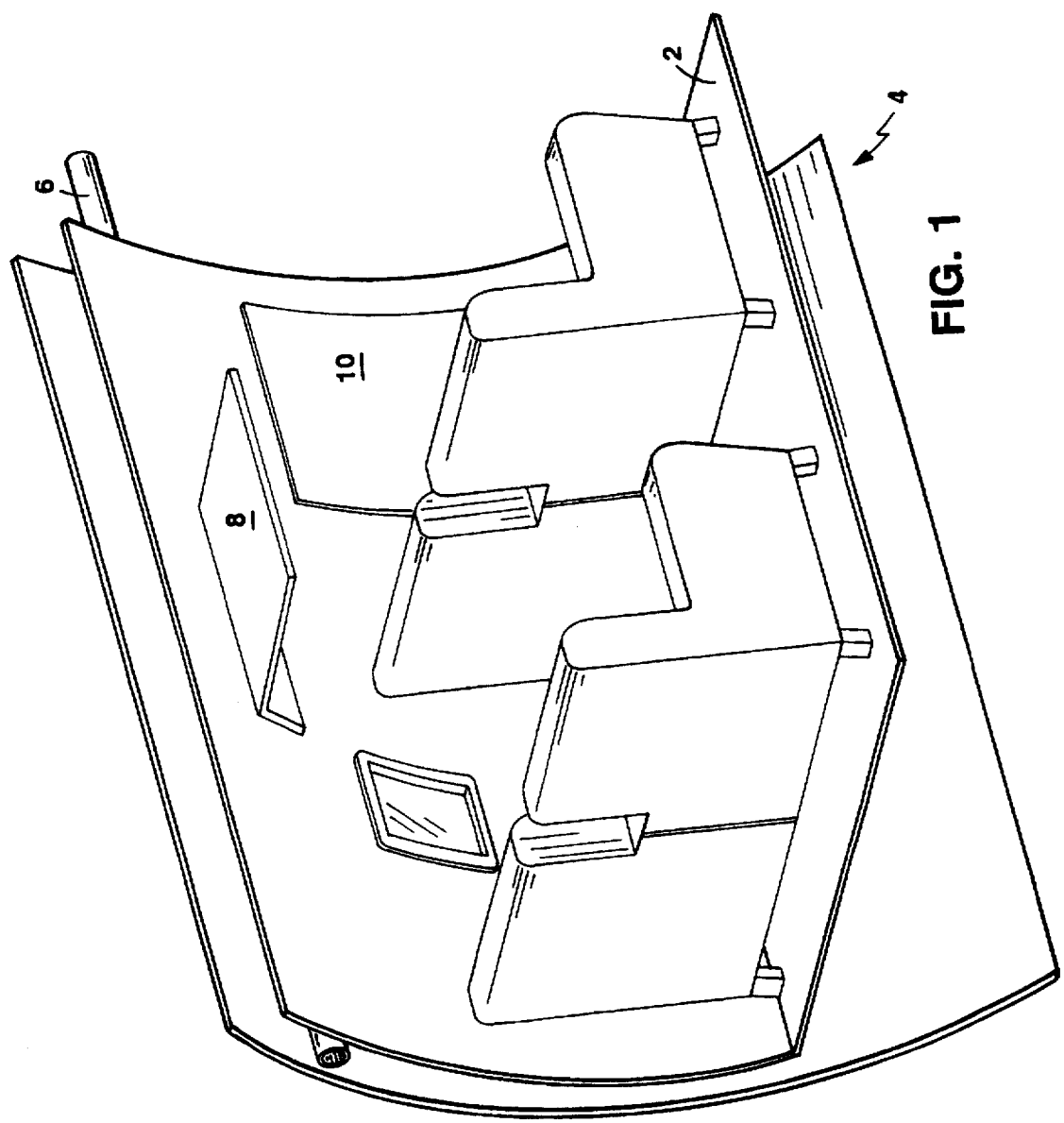
FIG. 1 is a perspective view of an aircraft passenger compartment equipped with structural, non-weight bearing composite materials of the invention.

Referring to FIG. 1, the passenger compartment or pressure shell 2 of a modern commercial jet aircraft 4 is provided with improved structural, non-weight-bearing composite materials of the invention, including, e.g., air-conditioning duct 6, ceiling panels 8 and wall panels 10.

According to preferred embodiments of the invention, composite materials suitable for use within the passenger compartment of a commercial aircraft are formed, at least in part, of first and second walls formed of a web of random or oriented non-woven or woven glass fibers impregnated with a low heat release polymeric binder containing a chemical flame retardant, with an intervening layer, or a plurality of intervening layers, of felt material disposed therebetween.

Figure 2:
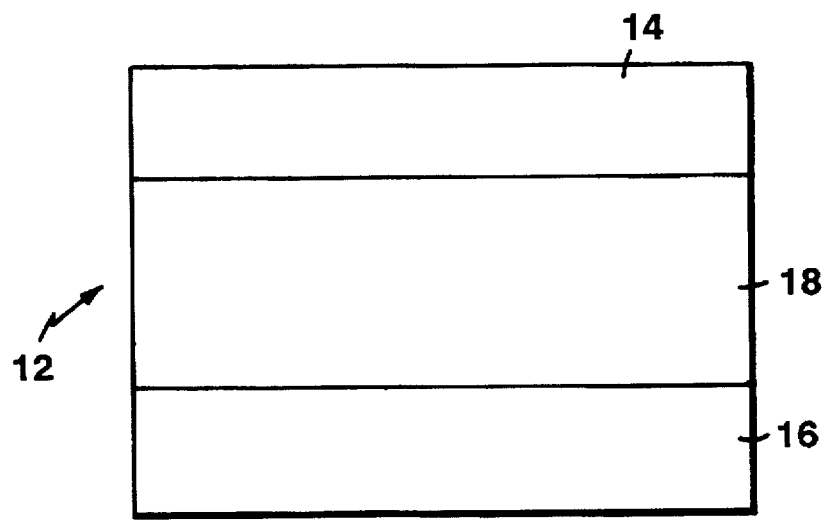
FIG. 2 is a somewhat diagrammatic side view of one embodiment of a composite material of the invention.

Referring to FIG. 2, a composite material 12 according to one embodiment of the invention has a first wall 14 and a second wall 16, with an intervening layer 18 of felt disposed therebetween. Preferably, the first wall is of glass cloth and the second wall is of glass scrim, although both could be of any suitable fibrous cloth, scrim, or non-woven web. The cloth layer preferably contains from about 30 to 34 percent resin, most preferably about 32% resin; the scrim layer preferably contains from about 36 to 40 percent resin, most preferably about 38 percent resin. The felt layer, in this embodiment, preferably has a thickness of from about 0.150 to 0.190 inch, most preferably about 0.160 inch, prior to processing and curing, and contains from about 28 to 32 percent resin by weight, most preferably about 30% resin. Higher levels of resin will enhance the mechanical properties of the composite, but will also increase its heat release; similarly, lower levels of resin will reduce the heat release of the composite, but will also tend to impair its mechanical properties. Preferred levels of resin for a given application can be determined based on the balance of properties desired.

The felt material is preferably formed of aramid resin fibers, commercially available from DuPont under the tradename NOMEX. These fibers have a low heat release, and thus the felt layer is able to work in combination with the wall elements to maintain acceptably low levels of heat release in the composite material. Preferably, the fibers have a denier of from about 1.5 to 2 and a staple length of from about 2 inches to 3 inches. The felt layer serves also as a heat insulator for any variation of temperature across the composite material, and as a sound insulator to reduce the acoustic level across the composite material. The felt may be formed by conventional carding and needle loom processing. The density of the felt is a determining factor in the amount of resin that the felt will be capable of absorbing. Thus, the felt-forming process should be carefully monitored to ensure that the density of the felt is such that the felt is capable of absorbing the amount of resin necessary to give the desired properties for a given application. The factors that influence felt density are: the denier and length of the fiber; the carded batt weight; and the needle loom processing parameters, i.e., the needle size, depth of penetration, number of penetrations per linear inch; and number of passes through the needle loom. The control of these factors to obtain a desired felt density is well known in the textile art.

Suitable reinforcing polymeric resins are those which have low levels of heat release. A preferred resin is a phenolic resin selected to have as low a heat release as possible. More preferably, the phenolic resin is water-borne, rather than dissolved or suspended in organic solvent. A suitable water-borne phenolic resin is available from Georgia Pacific, and contains approximately 76% solids by weight. When impregnating the fibrous layers (e.g., glass scrim or cloth), this 76% solids aqueous suspension is preferably used as supplied (small amounts of water may be added for ease of processing, but this does not significantly affect the resulting resin content of the impregnated fibrous layer), while when impregnating the felt layer it is preferred that the suspension be diluted with water to about 26% solids, or a viscosity of about 15 cps. The solids level of the suspension used to impregnate the felt layer can be varied to compensate for the density of the felt, i.e., for a higher density felt layer, a lower viscosity, lower solids level suspension can be used to achieve better penetration of the felt. For example, for a 0.160 inch thick felt having a density of 10–12 oz/yd$^2$, 100% water is used, whereas for a 0.050 inch thick felt having a density of 4 oz/yd$^2$, 175% water is used.

The fire retardant agents that are preferably combined with the resin may comprise one or more components that act to reduce the heat release rate in a manner common to the state-of-the-art. Examples of suitable fire retardant agents and/or compositions include alumina trihydrate, zinc borate and similar chemicals. Generally, the fire retardant agents are only included in the fibrous (non-felt) layers of the composite, as the low-solids resin suspension used to impregnate the felt layer(s) tends to be too low in viscosity to suspend most fire retardant agents. However, if they can be adequately suspended in the impregnating resin suspension, these agents may be included in the felt layers as well.

Figure 3:
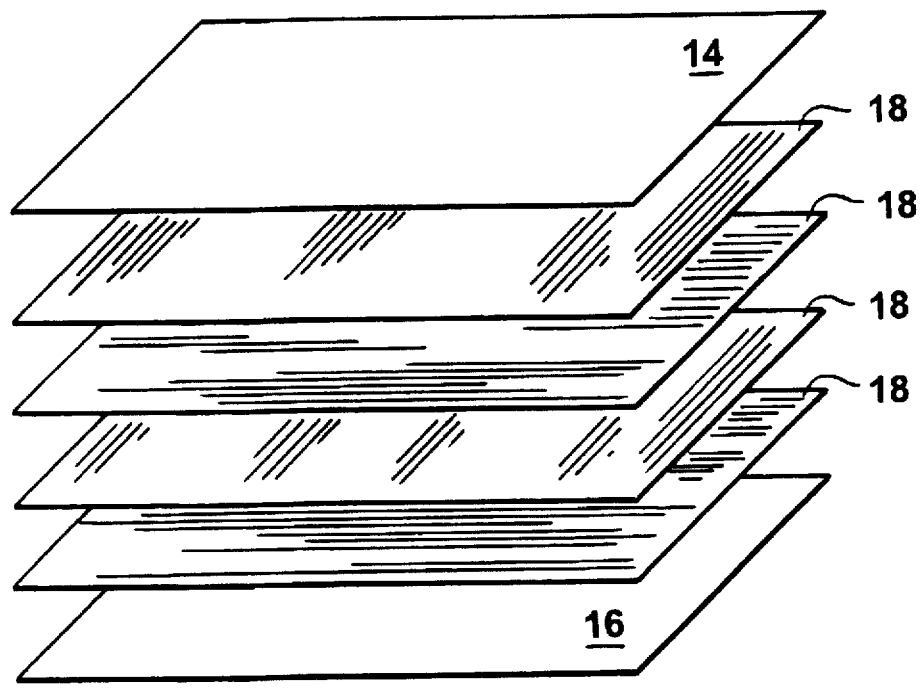
FIG. 3 is a somewhat diagrammatic exploded perspective view of the wall of another embodiment of a composite material of the invention.

Another embodiment of the invention is shown in FIG. 3. In this embodiment, the composite material includes a plurality of felt layers 18 (four layers are shown). Each layer is positioned so that the predominant direction of the fibers in that felt layer is at an angle with respect to the predominant direction of the fibers in any adjacent felt layer. Preferably, as shown, the felt layers are positioned such that each is at an 80–100 degree angle, more preferably a 90 degree angle, with respect to its adjacent layers. It is preferred that when a plurality of felt layers are used, each layer is relatively thin. For example, when four layers are used, as shown, preferably each layer has a thickness of from about 0.045 inch to 0.055 inch, most preferably about 0.050 inch. It is also preferred that each layer contain from about 30 to 34% resin by weight, most preferably about 32% resin. As described above, the desired amount of resin will vary depending upon the balance of mechanical strength and heat release needed in a given application. In this embodiment, the first and second walls 14, 16 are preferably both formed of glass cloth, which preferably contains from about 30 to 34% resin by weight, more preferably about 28% resin.

A polymeric film 36, e.g., polyvinylidene fluoride or nylon film about 0.001 to 0.002 inch thick, renders the composite wall impermeable to flow of air (reduced air impermeability, or complete impermeability to air, is desirable in construction of ducts). A suitable polyvinylidene fluoride film is commercially available from DuPont under the tradename TEDLAR. The film may be bonded to other components of the composite that are impregnated or coated with phenolic resin upon application of heat and pressure during the molding operation, or may be applied later, after the composite material is cured, using adhesive or other known methods. The polymeric film, e.g., polyvinylidene fluoride, may be given a primer coat of phenolic resin to enhance mechanical bonding. The nylon film is known to solvate with the phenolic interface of the adjacent pre-preg layer to form a chemical bond that improves most mechanical properties, providing, e.g., improved flexing, impact and shatter resistance, and hoop strength; however, it is important to limit the degree of solvation in order to maintain a desired level of impermeability. The polymeric film may be embossed and/or printed to have a decorative effect, e.g., when the composite material is intended for use as panelling in the passenger compartment of an aircraft.

A layer of metallic film 38, e.g. an aluminum film 0.0007 to 0.0016 inch thick, can be included to render the wall impermeable and to reflect heat, thus lowering the heat release characteristics of the composite material. The metallic film may also be given a primer coat of phenolic resin to enhance mechanical bonding.

Composite materials of the invention are preferably formed by applying a solution or suspension of the reinforcing polymeric resin to each layer individually, running that layer through squeeze rollers or the like to cause the resin to impregnate the layer, oven drying each layer at a temperature of from about 65° to 77° C. to drive off the solvent/water and "b-stage" the layer, laying up the layers in the desired arrangement, and heating at a temperature of about 150° C. and a pressure of about 15 psi to cure and bond the layers to form the composite material and to force trapped air and any remaining water out of the felt layer(s). Preferably, the composite is compressed to a sufficient extent so that its final thickness will be from about 0.035 inch to 0.100 inch thick. As the composite becomes thinner, it will tend to become more rigid and board-like. As noted above, the barrier and/or decorative layers can be applied either during the laying up step, or after curing using an adhesive of the like. Also, the layers can be stitched or needled together prior to bonding, to facilitate handling an improve bond strength.

The following examples are intended to illustrate the invention, and are not intended to be of limiting effect.

EXAMPLE 1

A composite lay-up was formed by laying up, in the following order, one layer of style #120 glass cloth prepreg, one layer of 0.160 inch Nomex felt prepreg, and one layer of style #3701 glass scrim prepreg. The glass cloth and glass scrim prepreg layers were impregnated with a Georgia Pacific water borne phenolic resin having a solids level of 76%. The cloth layer contained about 32% resin; the scrim layer contained about 38% resin. The felt layer had a density of about 5.7 pcf, and was impregnated with the same water borne phenolic resin, diluted with water to a solids level of about 38%. The prepreg layers were formed by oven drying the impregnated layers at a temperature of approximately 70° C.

The composite lay-up was placed between two aluminum caul plates, having a mold release applied to the surfaces which would make contact with the composite, and spacers of a thickness of 0.090 inch were also placed between the caul plates to act as stops to regulate the finished thickness of the composite. The caul plate, composite, and spacer assembly were then placed in a heated platen press at a temperature of 300° F. The platen press was then closed and maintained at a pressure of 15 PSI and 300° F. for a time period of 30 minutes.

The resulting composite demonstrated a weight of 27 $OZ/YD^2$ and OSU heat release valves of: peak HRR=45.2 and 2 minute HRR=43.3

EXAMPLE 2

A composite lay-up was formed by laying up, in the following order, one layer of style #120 glass cloth prepreg, four layers of 0.050 inch thick Nomex felt prepreg, with each layer being oriented at 90° to the machine direction of the previous layer, and one layer of style #120 glass cloth prepreg.

The method used to form each prepreg layer, and the composite set-up and curing process was identical to that of Example 1, except that the resin dispersion used to saturate the felt layers has a solids content of about 26%, rather than 38%.

The resulting composite demonstrated a weight of 32 $OZ/YD^2$ and OSU heat release values of: peak HRR=52.0 and 2 minute HRR=51.0, and a flexural strength value approximately three times greater than that of the composite of Example 1.

Other embodiments are within the following claims. For example, composite materials of the invention may be employed in the form of any structural, non-weight bearing elements of an aircraft passenger compartment, e.g. wall and ceiling panels. In these and other embodiments, the order of the composite layers may be varied as desired according to the desired application. For example, in wall panels, where the non-woven layer is to be the passenger compartment side of the panel for reasons of appearance, the metallic film may be applied upon the nylon film, e.g. as the opposite surface layer, in order to better retard penetration of heat into the passenger compartment in the event of a fire.

Also, multiple layers of non-woven and/or woven prepreg material may be employed for adding bulk to the composite material, and thus increasing wall thickness and stiffness, where such characteristics are desired.

Although the foregoing describes several embodiments of a composite material of the invention, it is understood that the invention may be practiced in still other forms, including but not limited to with greater or fewer layers, still within the scope of the following claims. For example, the concept of the invention may be employed also in underwater environments, i.e. in submarines, with similar performance requirements for heat release, flammability, smoke release and/or toxic gas release.

What is claimed is:

1. A composite material comprising a reinforcing polymeric resin, and a plurality of felt layers impregnated with said reinforcing polymeric resin, each felt layer comprising a plurality of fibers having a predominant fiber direction, said felt layers being arranged so that said predominant fiber direction of each layer is at a transverse angle with respect to the predominant fiber direction of the immediately adjacent layers, at least one of said felt layers comprising a needle entangled web.

2. A composite material of claim 1 comprising four felt layers, each felt layer being disposed at a 90 degree angle with respect to immediately adjacent felt layers.

3. A composite material of claim 1 wherein each felt layer comprises from 30 to 34 weight percent of a first reinforcing polymeric resin.

4. A composite material of claim 1 further comprising an outer wall comprising a fibrous non-woven web or fabric.

5. A composite material of claim 4 wherein said outer wall is coated or impregnated with a second reinforcing polymeric resin and bonded to one of said felt layers.

6. A composite material of claim 3 wherein said reinforcing polymeric resin is a phenolic resin.

7. A composite material of claim 5 wherein each said reinforcing polymeric resin is a phenolic resin.

8. A composite material of claim 1 wherein said felt layer comprises fibers selected from the group consisting of carbon, graphite, glass, aramid and mixtures thereof.

9. A composite material of claim 8 wherein said felt layer comprises predominantly aramid fibers.

10. A composite material of claim 4 wherein said outer wall comprises a glass fabric or scrim.

11. A composite material of claim 3, 5, 6 or 7 wherein said reinforcing polymeric resin is a water-borne resin.

12. A composite material of claim 5 wherein said first and second reinforcing polymeric resins comprise the same polymer.

13. A composite material of claim 1 or 4 further comprising a barrier layer selected to render the composite impermeable to the flow of air.

14. A composite material comprising a layer of felt material in a compressed state, and impregnated with a reinforcing polymeric resin comprising a water-borne phenolic resin, said layer of felt material containing from 28 to 32 percent by weight of said reinforcing polymeric resin after the water carrier of said water-borne phenolic resin has been driven off.

* * * * *